US009229535B2

(12) United States Patent
Vice et al.

(10) Patent No.: US 9,229,535 B2
(45) Date of Patent: *Jan. 5, 2016

(54) HAPTIC AUTOMATED COMMUNICATION SYSTEM

(71) Applicant: Anthrotronix, Inc., Silver Spring, MD (US)

(72) Inventors: Jack M. Vice, Stafford, VA (US); Corinna E. Lathan, Silver Spring, MD (US); James Drane, Washington, DC (US); Jonathan Farris, Silver Spring, MD (US); Bryan Hays, Damascus, MD (US); Joli Rightmyer, Arlington, VA (US); Anna Skinner, Silver Spring, MD (US)

(73) Assignee: Anthrotronix, Inc., Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,486

(22) Filed: Jan. 13, 2014

(65) Prior Publication Data

US 2014/0125586 A1 May 8, 2014

Related U.S. Application Data

(63) Continuation of application No. 12/766,940, filed on Apr. 26, 2010, now Pat. No. 8,629,834.

(60) Provisional application No. 61/172,576, filed on Apr. 24, 2009.

(51) Int. Cl.
*G09G 5/00* (2006.01)
*G06F 3/01* (2006.01)

(52) U.S. Cl.
CPC ............... *G06F 3/017* (2013.01); *G06F 3/011* (2013.01); *G06F 3/013* (2013.01); *G06F 3/016* (2013.01)

(58) Field of Classification Search
None
See application file for complete search history.

(56) References Cited

U.S. PATENT DOCUMENTS

| 7,082,570 | B1 | 7/2006 | Von Wiegand et al. |
| 8,629,834 | B2 * | 1/2014 | Vice et al. ................ 345/156 |
| 2002/0083025 | A1 * | 6/2002 | Robarts et al. ............. 706/12 |
| 2006/0125806 | A1 * | 6/2006 | Voyles et al. .............. 345/184 |
| 2006/0277664 | A1 | 12/2006 | Akhtar et al. |
| 2009/0040296 | A1 | 2/2009 | Moscato |

* cited by examiner

*Primary Examiner* — Kenneth B Lee, Jr.
(74) *Attorney, Agent, or Firm* — Lieberman & Brandsdorfer, LLC

(57) ABSTRACT

A haptic communication system having a range of sensors embedded with an operator's attire. Data collected by the sensors is processed by a computing device local to the operator and is communicated via a haptic modality in real-time to other team members and robotic assets in the system.

15 Claims, 5 Drawing Sheets

HAPTIC AUTOMATED COMMUNICATION SYSTEM

CROSS REFERENCE TO RELATED APPLICATION(S)

This application is a continuation patent application claiming the benefit of the filing date of U.S. patent application Ser. No. 12/766,940 filed on Apr. 26, 2010, and titled "HAPTIC AUTOMATED COMMUNICATION SYSTEM", which is hereby incorporated by reference, which is a non-provisional utility patent application claiming the benefit of the filing date of U.S. provisional patent application Ser. No. 61/172,576, filed Apr. 24, 2009, and titled "HAPTIC AUTOMATED COMMUNICATION SYSTEM" which is also hereby incorporated by reference.

BACKGROUND

1. Technical Field

The present invention relates to a communication system that allows communication of body position(s) through haptic communication. More specifically, this pertains to an automated haptic communication system.

2. Description of the Prior Art

Specific environments are characterized by individual and team decision makers who may be spatially (line of sight) separated and must coordinate to share information and resources to attain mission goals in dynamic and uncertain situations. Examples of such environments include, but are not limited to military, law enforcement, medical, first responder, etc. In addition to communications between team members, communications between team members and robotic platforms are also required. Communications between team members in a military environment include radio, voice, and hand-and-arm signal communications. Currently, communication and situational awareness of unit members may be limited during military operations. Radio communications between unit members are often transmitted and received on a single channel creating a communication challenge as only one given unit member can transmit information at any given time. Voice and voice-over-radio communications are also limiting in situations in which noise discipline must be maintained, as well as situations in which combat noises drown out voice communications. Standard hand-and-arm signal communications can be silently propagated from one team member to another within line of sight. However, this takes time and requires additional attention in order to receive commands. In addition, hand-and-arm signals are vulnerable to enemy interception.

Communications between robotic platforms and human operators may also be limited. Robotic assets, often used in hostile areas, perform tasks that are hazardous for humans. Such tasks include reconnaissance missions, searching a specific area to gather tactical intelligence, etc. Robotic assets combine sensors, such as laser range finders, sonar, global positioning systems, ultrasound, compasses, and digital video cameras, providing information about the world around them with a computational platform. A robotic asset is typically controlled from a remote location using an operator control unit, which exploits the operator's visual and auditory modalities, requiring the use of one or both of the operator's hands.

Accordingly, there is a need for a system that would provide for real-time capture of individual location and action information, as well as static and dynamic hand signals, to subsequently present this information to other team members and robotic assets in a manner not requiring exploitation of the auditory and visual modalities of team members. The above objective is met in the present by combining a sensor based gesture recognition system with representation of the sensed information to a remote team member via a haptic display.

SUMMARY

This invention comprises a communication system to be used in a hazardous environment.

In one aspect, a communication system comprises a set of sensors, a computing system, and a haptic display embedded within the operator's attire. The sensors transmit data to the computing device. The computing device of each operator is in bidirectional communication with computing devices embedded with other operator's attire and robotic assets. The data processed by the computing device are subsequently communicated to the haptic display of each operator and/or to robotic assets.

In another aspect, a method of communicating data between multiple users in a network is provided. A first user has a first set of sensors and a first haptic display in communication with a first computing device embedded local to the first user. A second user has a second set of sensors and a second haptic display in communication with a second computing device embedded local to the second user. Bi-directional communication is established between the first and second computing to simultaneously exchange sensor data between the first and second users. In addition, the data received by the first user from the second user is communicated to the first haptic display.

Other features and advantages will become apparent from the following detailed description of the presently preferred embodiments taken in conjunction with the accompanying drawings.

BRIEF DESCRIPTION OF THE DRAWINGS

The drawings referenced herein form a part of the specification. Features shown in the drawing are meant as illustrative of only some embodiments, and not of all embodiments unless otherwise explicitly indicated. Implications to the contrary are otherwise not to be made.

DETAILED DESCRIPTION

Figure 1:
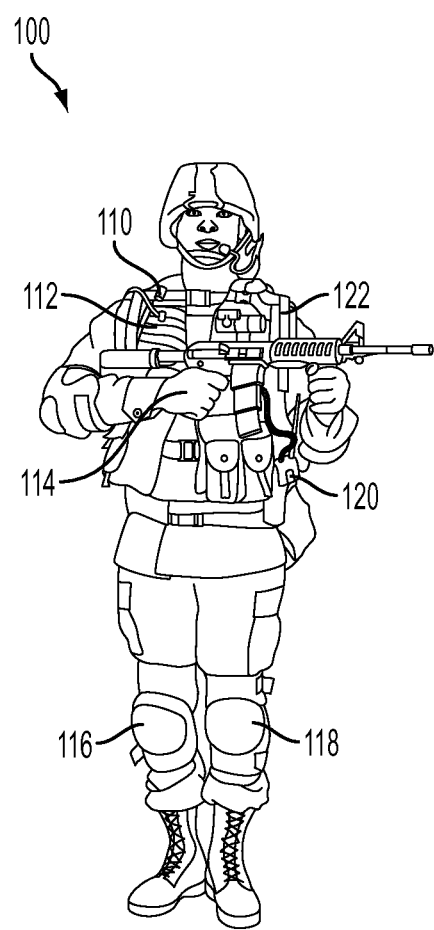
FIG. 1 is a block diagram illustrating placement of HACS components according to the preferred embodiment.

It will be readily understood that the components, as generally described and illustrated in the Figures herein, may be arranged and designed in a wide variety of configurations. Thus, the following detailed description of the embodiments of the apparatus, system, and method, as presented in the Figures, is not intended to limit the scope of the invention, as claimed, but is merely representative of selected embodiments.

The functional units described in this specification have been labeled as managers. A manager may be implemented in programmable hardware devices such as field programmable gate arrays, programmable array logic, programmable logic devices, or the like. The manager may also be implemented in software for execution by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of recovery manager, authentication module, etc., to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments will be best understood by reference to the drawings, wherein like parts are designated by like numerals throughout. The following description is intended only by way of example, and simply illustrates certain selected embodiments of devices, systems, and processes that are consistent with the invention as claimed herein.

A Haptic Automated Communication System (HACS) is a bi-directional closed loop communication system comprising one or more sensors embedded within an operator's attire. The sensors may include, but are not limited to, orientation sensors, pressure sensors, inertial sensors, physiological sensors, light sensors, electro-magnetic, radio frequency, as well as a global positioning system (GPS) and digital compass sensors. In one embodiment, the system may be expanded to include a video device to communicate images among the operators and robotic device in the system. The video device may be local to any of the elements in the closed loop system. In one embodiment, the video device is local to the robotic asset. The video device supports image functionality by providing images in visible light spectrum thermal and infra-red imaging. In addition, the light sensors facilitate functionality within the closed loop system this functionality includes, but is not limited to, when light amplification and/or thermal imaging by the video device may be necessary to support communication of data.

Through these multiple sensors, the HACS collects status information regarding an individual operator. The status information includes, but is not limited to, physical location, orientation, body posture, movement, weapon firing status, and discrete hand-and-arm commands and signals. Pattern recognition software operates on a wearable computing platform integrated within the operator's attire. Information from the embedded sensors and robotic assets is automatically communicated to the wearable computing system of each operator and subsequently sent to other operators and robotic assets. In one embodiment, the data is communicated in the system in real-time, i.e. dynamically. Similarly, in another embodiment, the data is communicated in the system through a series of digital bursts. Accordingly, each operator receives information from all other operators and robotic assets via the haptic modality, presenting the complex data through tactile actuators embedded within the operator's attire.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope.

The Haptic Automated Communication System (HACS) includes a range of sensors such as accelerometers, gyroscopes, magnetometers, bend and pressure sensors, etc., as well as pattern matching algorithms for signal processing. Instrumentation of each team member enables status information of each individual team member, such as position, orientation, body posture, movement, and weapon status, to be automatically collected and communicated in real-time to team members, increasing overall team situational awareness without distracting from the mission goals. FIG. 1 is a block diagram (100) illustrating placement of HACS components according to one embodiment. Each of the components may be embedded within the operator's attire include an instrumented glove (114) for hand signal recognition and weapon activity sensing; GPS, gyroscopes, accelerometers, and a digital compass (110) for providing reliable positioning, and navigation to the operator; a vest with an embedded haptic communication display (122) for presenting complex information to the operator through tactile actuators; and a wearable computing system (120). In one embodiment, the embedded haptic communication display (122) is limited to tactile communication and does not employ auditory and/or visual resources. Similarly, in one embodiment, the components may include knee pads with embedded pressure sensors (116) and (118); and/or a heart rate monitor (112) to measure the operator=s heart rate in real-time. The instrumented glove (114) may be equipped with sensors for detecting finger bend, hand position, and orientation to allow a natural interface to computers. The haptic display (122) does not require employing auditory and visual resources of operators. A haptic communication display (HCD) informs a user by touch and does not require vision, thereby enabling the operator to maintain their line of sight and not be distracted by sensor data and associated communication. Accordingly, as shown herein, the hardware components of the HACS are embedded within the operator's attire.

Figure 2:
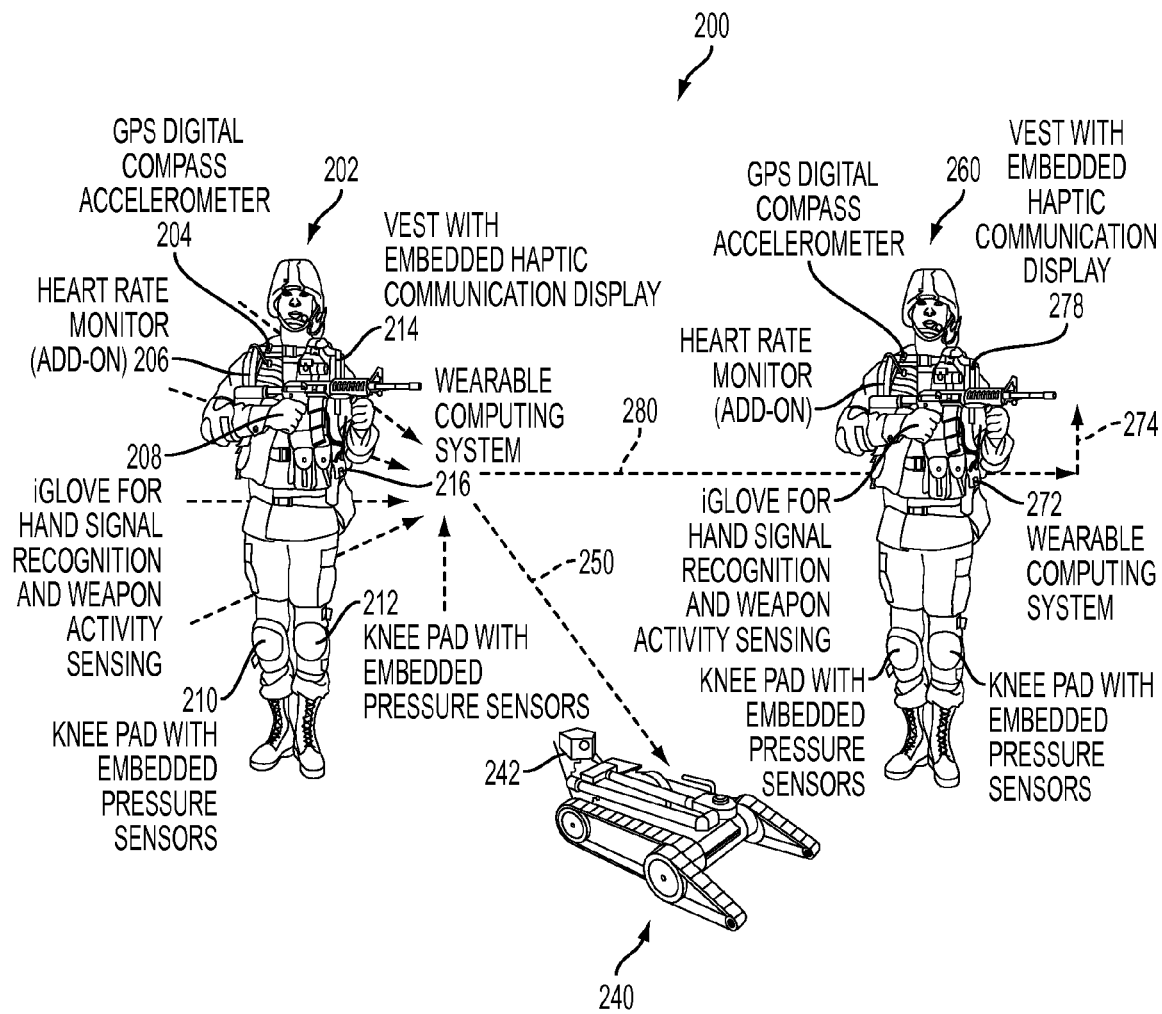
FIG. 2 is a block diagram illustrating unidirectional data flow from sensors of a first operator to a haptic display of a second operator and to a single robotic asset.
Figure 3:
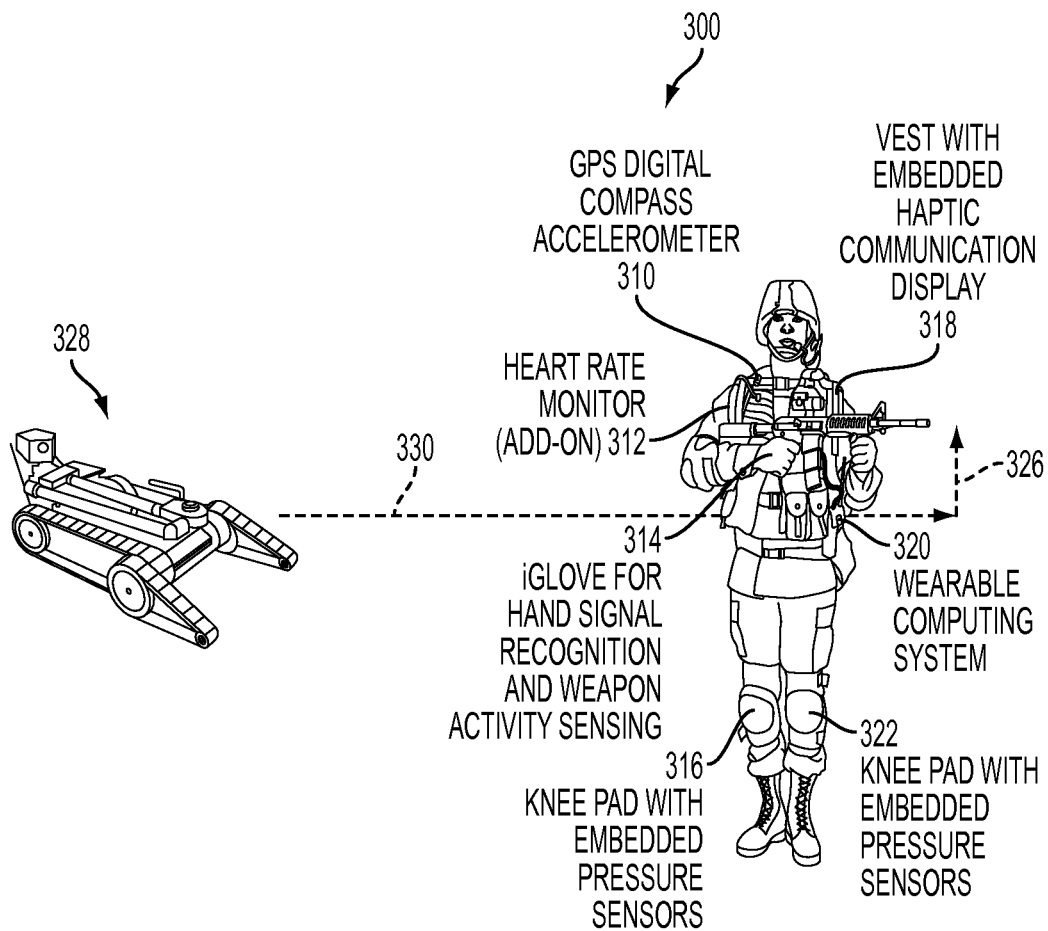
FIG. 3 is a block diagram illustrating unidirectional data flow from a robotic asset to a haptic display of a single operator.

In hazardous situations, effectiveness of communications between unit members and robotic assets is very important. FIG. 2 is a block diagram (200) illustrating unidirectional data flow from the sensors of a first operator (202) to a second operator (260), as well as to a robotic asset (240). In one embodiment, HACS is a portable, low power, lightweight, unobtrusive, real-time, bi-directional haptic communication system using vibratory actuators embedded in attire, which provides real-time information to individual operators during limited vision or out-of-sight operation. More specifically, the information collected by sensors, such as the instrumented glove (208), GPS, gyrosopes, digital compass, accelerometers (204), light sensors (not shown), and a vest with an embedded haptic communication display (214) are employed to present complex information to the operator through tactile actuators. In one embodiment, the knee pads with embedded pressure sensors (210) and (212), and/or a heart rate monitor (206) of the first operator (202), is directed to the first computing system (216) that is embedded within the attire of the first operator (202). Subsequently, the information, processed by the first computing system (216), is communicated to both a second computing system (272) embedded within attire of a second operator (260) as well as to a robotic asset (240). In one embodiment, a video device (242) is provided local to the robotic asset (240), and is employed to convey image data to the first and/or second operator (202) and (260), respectively. The second computing system (272) of the second operator (260) communicates relevant information to a haptic communication display (278) local to the second operator. In one embodiment, the display (278) is a visual display in communication with the second operator (260). Similarly, in one embodiment, the display (278) is embedded within the attire of the operator. Examples of embedded visual displays include, but are not limited to, configuring the attire of one or more of the operators with a head mount, such as a microdisplay, which may be provided with a visual display to convey visual data to the operator in communication with the display. Similarly, in one embodiment, the attire of one or more of the operators may include a visual display, such as a personal digital assistant, embedded within the attire and accessible by the operator. In each of these embodiments, the visual display may contain augmented vision capabilities such as light amplification and thermal imaging as conveyed by the video device (242) of the robotic asset (240). The direction of data flow between the first computing system (216), and the robotic asset (240) is shown by arrow (250). Similarly, the direction of data flow between the first computing system (216) and the second computing system (272) is represented by arrow (280), and the direction of data flow between the second computing system (272) and haptic display (278) is presented by the arrow (274). Although only two computing systems (216) and (272) and one robotic asset (240) are shown, the scope should not be limited to the quantity illustrated herein. In one embodiment, one or more additional computing system and robotic assets may be including in the HACS FIG. 3 is a block diagram (300) illustrating HACS unidirectional information flow from a robotic asset to an operator. The operator is provided with an instrumented glove (314) for hand signal recognition and weapon activity sensing; GPS, gyroscopes, digital compass, and/or accelerometers (310) for providing reliable positioning, navigation, and timing services to the operator; a vest with embedded haptic communication display (318) for presenting complex information to the operator through tactile actuators; a wearable computing system (320). In one embodiment, the wearable computing system includes a knee pad with embedded pressure sensors (316) and (322); and/or a physiological monitor, including but not limited to a blood oxygenation level measuring tool and a heart rate monitor (312). The robotic asset (328) sends information to the computing system (320) embedded in the operator's attire. The computing system (320) of the operator (324) communicates information to a haptic communication display (318), which is embedded within the operator's attire, e.g. vest. More specifically, the unidirectional data flow between the robotic asset (328) and computing system (320) is represented by the arrow (330). Similarly, the data flow between the computing system (320) and the haptic display (318) is represented by the arrow (326).

Figure 4:
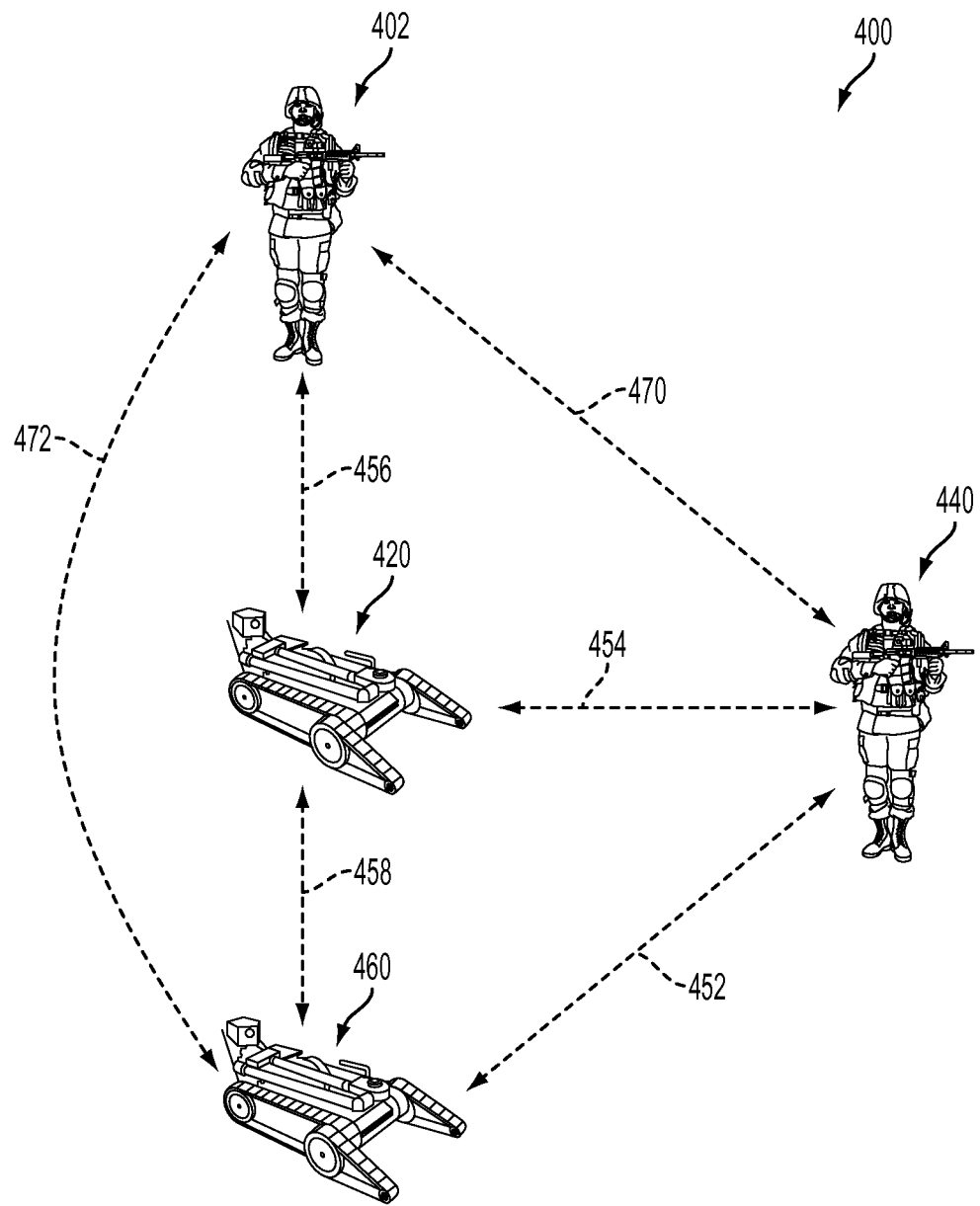
FIG. 4 is a block diagram illustrating bi-directional data flow between multiple operators and multiple robotic assets.

FIG. 4 is a flow diagram (400) showing two operators (402) and (440) and two robotic assets (420) and (460). Arrows (452)-(470) represent bi-directional data flow between the operators (402) and (440) and the robotic assets (420) and (460). More specifically, bi-directional data flow is shown as follows: (454) between the operator (440) and robotic asset (420); (456) between operator (402) and robotic asset (420); (458) between robotic asset (420) and robotic asset (460); (452) between operator (440) and robotic asset (460); (470) between operator (402) and operator (440); and (472) between operator (402) and robotic asset (460). The HACS closed loop system enables automated wireless bi-directional communication. In addition, it enables presentation of team status and activity information in real-time via the haptic modality to multiple operators. Accordingly, as shown in FIG. 4 sensor data is communicated from each operator and each robotic asset to all other operators and robotic assets in the looped system with each operator receiving information from all other operators and robotic assets via haptic modality.

Figure 5:
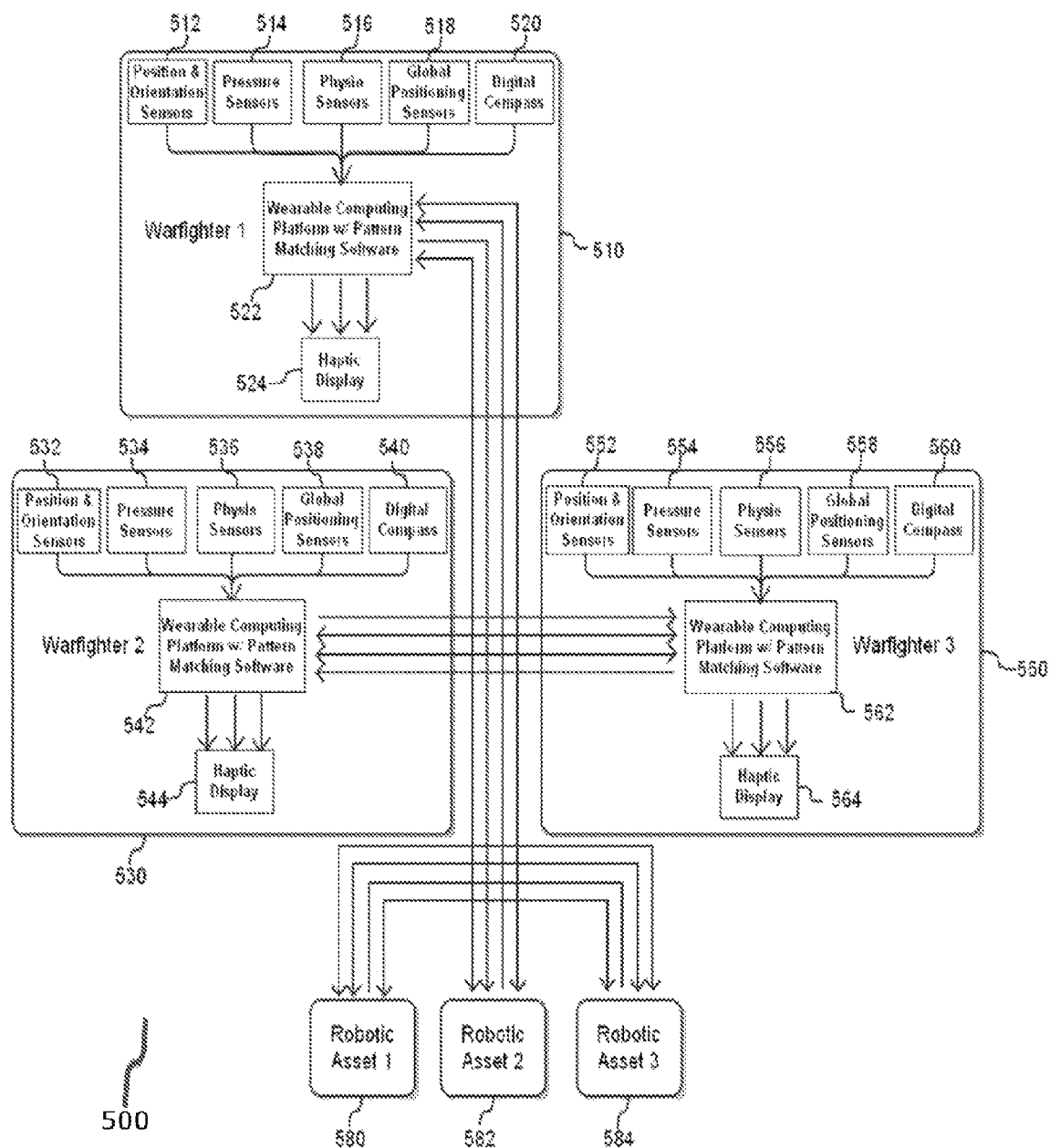
FIG. 5 is a block diagram illustrating HACS information flow between multiple operators and multiple robotic assets.

FIG. 5 is a block diagram (500) representing HACS information flow between multiple operators and multiple robotic assets. Each operator, represented as (510), (530), and (550), respectively, is in communication with the first, second, and third robotic assets (580), (582), and (584), respectively. Each of the operators (510), (530), and (550), wears attire with embedded sensors and a computer platform. More specifically, the first operator as represented at (510) is provided with a selection of one or more sensors, including but not limited to: one or more position and orientation sensors (512), one or more pressure sensors (514), one or more physiological sensors (516), one or more global positioning sensors (518), at least one digital compass (520), a wearable computing platform with pattern matching software (522), and a haptic display (524) for data representation. In a similar manner, the second operator (530) is provided with a selection of one or more sensors, including but not limited to: one or more position and orientation sensors (532), one or more pressure sensors (534), one or more physiological sensors (536), one or more global positioning sensors (538), at least one digital compass (540), a wearable computing platform with pattern matching software (542), and a haptic display (544) for data representation; and the third operator (550) is provided with a selection of one or more sensors, including but not limited to: one or more position and orientation sensors (552), one or more pressure sensors (554), one or more physiological sensors (556), one or more global positioning sensors (558), at least one digital compass (560), a wearable computing platform with pattern matching software (562), and a haptic display (564) for data representation.

The quantity and type of sensors embedded within the operator's attire is not limited to the quantity and type of sensors as described above. In one embodiment, the attire may be provided with a smaller quantity of sensors. Similarly, in another embodiment, a greater quantity of sensors is provided. The sensors (512)-(520) of the first operator communicate collected data to the computing device (522) local to the first operator. The computing device (522) transmits data collected by the sensors (512)-(520) to the computing devices (542) and (562) associated with the second and third operator, respectively, and receive data from the computing devices (542) and (562) of the second and third operator, respectively. The data received from the second and third operator is presented to the first operator via the haptic display (524). The bi-directional arrows show bi-directional data flow between computing devices (522), (542), and (562) of the first, second, and third operator (510), (530), and (550), respectively, as well as bi-directional data flow between each of the computing devices (522), (542), and (562) and robotic assets (580)-(584).

Accordingly, the communication system is comprised of a portable, low power, lightweight, unobtrusive, real-time, bi-directional haptic communication system using vibratory actuators embedded in combat attire, which provides real-time information to individual operators during limited vision or out-of-sight operations. The haptic language consisting of temporal and spatial haptic symbols and a generative grammar for presenting complex information, such as operator posture, movement and weapon status, as well as a means to convey commands such as those currently conveyed via hand signals is employed to present data to an operator via haptic display. The system of sensors is employed to convey status information, issue haptic commands, and summarize status and command information for haptic presentation. The resultant haptic communication system allows one to enhance information throughput, situational awareness, and performance of team members by utilizing human multi modal information processing capabilities.

The HACS system is an improvement over existing prior art systems due to the fact that it provides both passive and active information to be exchanged simultaneously and bi-directionally between multiple operators and multiple computer or robotic assets. The automated communication and presentation of relevant information is implemented via haptic modality while limiting the amount of communication equipment that must be carried or operated, and without exploiting the auditory or visual resources of operators. The HACS also decreases radio communications while increasing team situational awareness by automatically communicating basic status information and hand signal communications to all team members and robotic assets simultaneously, including those not within line-of-sight. Similarly, relevant information from robotic assets may be automatically communicated to team members via the haptic modality.

It will be appreciated that, although specific embodiments have been described herein for purposes of illustration, various modifications may be made without departing from the spirit and scope of the invention. In particular, the display should not be limited to a haptic display. In one embodiment, a non-haptic display may be employed as the sole visual display, or supplementary to the haptic display. Additionally, the operator in the HACS may come in different forms, including military application, first responder application, members of a medical team, search and rescue, firefighter, etc. The HACS may be employed in any environment that may benefit from a non-visual and non-auditory communication system. Accordingly, the scope of protection is limited only by the following claims and their equivalents.

We claim:

1. A communication system comprising:
a first operator having a first set of sensors and a first haptic display in communication with a first computing device embedded local to the first operator;
a second operator having a second set of sensors and a second haptic display in communication with a second computing device embedded local to the second operator;
the first and second computing devices in closed loop bi-directional communication;
the first computing device to communicate data received from the second operator via a manager to the first haptic display;
the manager to support simultaneous exchange of information associated with the first and second sets of sensors in real-time; and
at least one robotic asset in the closed loop system, the robotic asset supporting bi-directional communication with the computing device of each operator, wherein information provided by sensors is exchanged in real-time within the closed loop including said operators and the at least one robotic asset.

2. The system of claim 1, wherein said set of sensors is selected from the group consisting of: position and orientation, acceleration, physiological, global positioning, digital compass, pressure, light, electro-magnetic, radio frequency, and combinations thereof.

3. The system of claim 1, further comprising each computing device to support recognition of a hand gesture communicated by said sensors.

4. The system of claim 3, wherein gesture information received by the computing device of each operator from the sensors is presented to each of the operators via a haptic modality.

5. The system of claim 1, further comprising a visual display local to a head mount of at least one of the operators.

6. The system of claim 1, wherein the visual display is a micro-display.

7. The system of claim 1, further comprising a visual display embedded within clothing of the operator.

8. The system of claim 7, wherein the visual display is part of a personal digital assistant.

9. The system of claim 1, further comprising a video device for providing image functionality selected from the group consisting of: visible light spectrum, light amplification, and thermal, infra-red imaging and combinations thereof.

10. The system of claim 1, further comprising a physiological monitor in communication with the operator to manage physiological properties selected from the group consisting of: blood oxygenation level and heart rate.

11. A method of communicating data between multiple users in a network, comprising:
configuring a first user having a first set of sensors and a first haptic display in communication with a first computing device embedded local to the first user;
configuring a second user having a second set of sensors and a second haptic display in communication with a second computing device embedded local to the second user;
establishing closed loop bi-directional communication between the first and second computing devices, the communication to support haptic properties;
simultaneously exchanging sensor data between the users, including communicating data received by the first user from the second user to the first haptic display; and
at least one robotic asset in the closed loop system, the robotic asset supporting bi-directional communication with the computing device of each user, wherein information provided by the sensors is exchanged in real-time within the closed loop including the users and the at least one robotic asset.

12. The method of claim 11, wherein said first and second set of sensors is selected from the group consisting of: position and orientation sensors, acceleration, physiological sensors, global positioning sensors, digital compass, pressure sensors, light sensors, electro-magnetic, radio frequency, and combinations thereof.

13. The method of claim 11, further comprising computer operated instructions for recognition of activities communicated by said sensors.

14. The method of claim 11, further comprising computer operated instructions to for recognition of a hand gesture.

15. The method of claim 14, wherein gesture information received by the computing device of each user from the sensors is presented to each of the users via a haptic modality.

\* \* \* \* \*